(12) United States Patent
Miller et al.

(10) Patent No.: US 6,717,706 B2
(45) Date of Patent: Apr. 6, 2004

(54) STATE OF POLARIZATION DETECTOR

(75) Inventors: Peter J. Miller, Newburyport, MA (US); Paul J. Cronin, Charlestown, MA (US)

(73) Assignee: Cambridge Research and Instrumentation, Inc., Woburn, MA (US)

( * ) Notice: Subject to any disclaimer, the term of this patent is extended or adjusted under 35 U.S.C. 154(b) by 0 days.

(21) Appl. No.: 10/099,124

(22) Filed: Mar. 15, 2002

(65) Prior Publication Data

US 2003/0043445 A1 Mar. 6, 2003

Related U.S. Application Data

(63) Continuation-in-part of application No. 10/016,045, filed on Dec. 11, 2001, now Pat. No. 6,552,836, which is a continuation of application No. 09/652,702, filed on Aug. 31, 2001, now Pat. No. 6,373,614.
(60) Provisional application No. 60/276,566, filed on Mar. 15, 2001.

(51) Int. Cl.[7] .............................. G02F 1/00; G02F 1/03; G02F 1/09; G02F 1/29; G02B 27/28; G02B 6/00; G02B 6/26; G01J 4/00; G01B 9/02
(52) U.S. Cl. .................. 359/237; 359/250; 359/281; 359/316; 359/484; 359/494; 356/367; 356/453; 385/11; 385/15; 385/50; 372/703; 348/742; 348/751; 324/158.1; 398/205
(58) Field of Search ................ 372/703, 33; 385/2, 385/3, 11, 18, 15, 50; 348/742, 751; 324/158.1, 244.1; 398/205; 359/250, 237, 316, 484, 485, 494, 495, 496, 280, 281, 246, 245; 356/367, 453

(56) References Cited

U.S. PATENT DOCUMENTS

| | | | |
|---|---|---|---|
| 4,071,751 A | 1/1978 | Waksberg | |
| 4,597,640 A | 7/1986 | Buhrer | |
| 4,681,450 A | 7/1987 | Azzam et al. | |
| 4,725,145 A | 2/1988 | Azzam et al. | |
| 4,848,877 A | 7/1989 | Miller | |
| 4,979,235 A | 12/1990 | Rumbaugh et al. | |
| 5,005,952 A | 4/1991 | Clark | |
| 5,005,977 A | 4/1991 | Tomoff | |
| 5,440,414 A | 8/1995 | Kersey et al. | |
| 6,002,512 A | * 12/1999 | Bergmann et al. | 359/281 |
| 6,552,836 B2 | * 4/2003 | Miller | 359/237 |

OTHER PUBLICATIONS

Takafumi Chiba et al., *Journal of Lightwave Technology*, vol. 17, No. 5, May 1989, pp. 885–890.

* cited by examiner

Primary Examiner—Loha Ben
Assistant Examiner—Jack Dinh
(74) Attorney, Agent, or Firm—Fish & Richardson P.C.

(57) ABSTRACT

State of polarization detectors and polarization control systems are disclosed. For example, the invention features an integrated optical assembly including: (i) a series of polarization-sensitive interfaces defining an optical beam path for an input optical beam to pass through the assembly, wherein each polarization-sensitive interface derives a sample beam from the input beam; and (ii) one or more retardation layers each positioned between a different pair of the polarization-sensitive interfaces, wherein the retardation layers are integrally coupled with the polarization-sensitive interfaces, and wherein the retardation layers and polarization-sensitive interfaces cause each sample beam to have an intensity that provides different information about the state of polarization of the input beam.

43 Claims, 5 Drawing Sheets

STATE OF POLARIZATION DETECTOR

CROSS-REFERENCE TO RELATED APPLICATIONS

This application claims priority to U.S. Provisional Application Ser. No. 60/276,566 filed Mar. 15, 2001, the contents of which are incorporated herein by reference. This application is also a continuation-in-part application of U.S. application Ser. No. 10/016,045 filed Dec. 11, 2001 and issued as U.S. Pat. No. 6,552,836 on Apr. 22, 2003, which is a continuation application of U.S. application Ser. No. 09/652,702 filed Aug. 31, 2001 and issued as U.S. Pat. No. 6,373,614 on Apr. 16, 2002, the contents of said applications being incorporated herein by reference.

BACKGROUND

This invention relates to optical systems for monitoring the state of polarization (SOP) of an optical beam.

The transmission of information over optical fibers is pervasive in modern communication networks. Optical fibers are often favored over electrical cable because optical fiber offers much larger bandwidths than cable. Moreover, optical fiber can connect nodes over larger distances and transmit optical information between such nodes at the speed of light. Among factors limiting transmission rates and distances in high-speed fiber systems, however, are polarization effects such as polarization mode dispersion (PMD) in optical systems such as optical fibers.

Polarization mode dispersion arises from small, random birefringences in optical fibers. For sufficiently short sections of fiber, birefringence may be considered uniform, and light traveling along the fast and slow axes experience different propagation delays. For longer sections of fiber, however, the orientations and amplitudes of the birefringence varies, leading to a phenomenon called polarization mode coupling. The polarization mode coupling eventually randomizes the polarization state of the propagating optical signal. PMD also results in pulse broadening, which reduces the available bandwidth of the optical fiber.

It is therefore desirable to reduce the effects of PMD. This can be accomplished by compensating for PMD by detecting or analyzing the state of polarization (SOP) of the optical signal, and passing the optical signal through a polarization modulator (e.g., a variable retarder stack) to reduce such PMD effects in response to the detected state of polarization of the signal. For example, the polarization modulator can impart a retardance that is exactly opposite to that experienced by the optical signal in the fiber. An example of a prior art polarization compensation system is described by T. Chiba et al., in "Polarization Stabilizer Using Liquid Crystal Rotatable Waveplates," in *Journal of Lightwave Technology*, Vol. 17, No. 5, May 1999.

Referring to FIG. 1, an example of a polarization analyzer 10, disclosed by Chiba et al., includes a pair of beamsplitters 12 and 13 position in the path of a beam 11 of unknown SOP. Beam splitters 12 and 13 direct sample beams 22 and 23 toward polarizing beamsplitters 30 and 32. Prior to contacting polarizing beamsplitter 32, sample beam 23 passes through a quarter wave plate 25. Polarizing beamsplitters 30 and 32 split sample beams 22 and 23 into orthogonal X and Y polarization components, where the X polarization component is the linear component in the plane of FIG. 1 and the Y polarization component is the linear component orthogonal to the plane of FIG. 1. The intensity of each component is measured by photodiodes 35–38. Quarter waveplate 25 is oriented at 45° with respect to the nominal X and Y directions, therefore if dectectors 35 and 36 measure the relative linear x and y components of beam 11, then detectors 37 and 38 measure the right-hand and left hand circular components. Accordingly, the SOP of beam 11 can be determined from these two sets of orthogonal components.

SUMMARY

The invention features an integrated optical assembly for providing information about the state of polarization (SOP) of an input beam passing through the assembly. Hereinafter, the assembly is also referred to as an SOP detector. The assembly includes multiple polarization-sensitive interfaces each providing a sample beam having an intensity providing information about the SOP of the input beam. For example, the assembly may provide four or more sample beams, the intensities of which are sufficient to uniquely determine the SOP of the input beam. Alternatively, the optical assembly may provide fewer than four sample beams, where the intensities of the sample are sufficient to determine the SOP of the input beam when combined with some a priori knowledge about the nominal SOP of the input beam. Furthermore, the optical assembly may provide multiple sample beams (e.g., 2 or 3 or more beams) whose intensities indicate a deviation of the SOP of the input beam from a desired SOP. The measured deviation can be used to provide a feed-forward or feed-back signal to a polarization modulator that alters the SOP of the beam.

At least two, and preferably all, of the polarization-sensitive interfaces in the optical assembly are oriented to direct the sample beams in a similar direction and to allow a compact integration of the optical assembly components. For example, the polarization-sensitive interfaces can be oriented substantially parallel to one another. Because the sample beams propagate in a similar direction, a single detector array can be used to monitor the intensities of the sample beams and add to the compactness of the overall optical system.

The optical assembly also includes a retardation layer positioned between each pair of similarly-oriented polarization-sensitive interfaces. The retardation layer(s) alter the polarization state of the beam to allow the polarization-sensitive interfaces to sample different polarization components of the input beam, and cause the intensity of each sample beam to provide different information about the SOP of the input beam. In preferred embodiments, such retardation layers are oriented similarly to the polarization-sensitive interfaces to improve the compactness of the optical assembly. For example, they can be oriented substantially parallel to the polarization-sensitive interfaces. Such a construction can be accomplished by forming each polarization-sensitive interface adjacent an optical window used to support a retardation layer. This can result in a monolithic and compact integration of the optical assembly components.

To separate the sample beams from the input beam, the optical assembly defines an optical beam path that contacts each of the polarization-sensitive interfaces at a non-normal angle (e.g., an angle of about 45°). In preferred embodiments, the optical assembly may further include an input prism and/or an output prism having a surface oriented substantially normal to the optical beam path to increase the coupling efficiency of the input beam into and out of the assembly. The assembly may also include a pre-compensation retarder to adjust the polarization state of the input beam prior to it contacting any of the polarization-sensitive interfaces and/or a post-compensation retarder to adjust the polarization state of the beam upon exiting the assembly. For example, the post-compensation retarder can be selected to cancel or minimize any change in the SOP of the input beam caused by passing through any of the intermediate retarders and/or polarization-sensitive interfaces.

The polarization-sensitive interfaces are constructed to sample only a small fraction of the input beam energy. For example, the optical assembly can have an insertion loss of less than 1 dB, or even less than 0.5 dB, or even less than 0.2 dB. Thus, the optical assembly can be positioned in the path of optical beam (e.g., a beam carrying optical telecommunication information) without significantly degrading the beam emerging from the assembly. Furthermore, the sample beams produced by the optical assembly have intensities that directly provide information about the SOP of the input beam. In other words, additional optical polarization processing of the sample beams is not necessary, thereby eliminating additional optical components and further adding to the compactness of the overall system.

The SOP detector can be used in a polarization control system that further includes a polarization modulator that adjusts the polarization of the input beam in response to a feed-back or feed-forward signal generated from the intensities of the sample beams. The polarization control system can be used to stabilize a varying SOP in an optical signal beam caused by effects such as PMD. Thus, the beam enters the polarization control system with an unknown (or only a nominally known) time-varying SOP and emerges from the system with a selected, well-defined SOP.

In general, in a first aspect, the invention features an integrated optical assembly including a series of polarization-sensitive interfaces defining an optical beam path for an input optical beam to pass through the assembly, wherein each polarization-sensitive interface derives a sample beam from the input beam. The integrated optical assembly also includes one or more retardation layers each positioned between a different pair of the polarization-sensitive interfaces, wherein the retardation layers are integrally coupled with the polarization-sensitive interfaces, and wherein the retardation layers and polarization-sensitive interfaces cause each sample beam to have an intensity that provides different information about the state of polarization of the input beam.

Implementations of the integrated optical assembly can include one or more of the following.

One of the retardation layers can be oriented substantially parallel with one of the polarization-sensitive interfaces. Each polarization-sensitive interface can derive less than 5% (e.g., less than 2%) of the input beam intensity to produce the corresponding sample beam.

At least two of the polarization-sensitive interfaces can be oriented substantially parallel to one another. For example, all of the polarization-sensitive interfaces can be oriented substantially parallel to one another.

The optical beam path can contact each polarization-sensitive interface at a non-normal angle (e.g., in the range of 30 degrees to 60 degrees). The series of polarization-sensitive interfaces can include three polarization-sensitive interfaces providing three sample beams. One or more retardation layers can include two retardation layers and the three polarization-sensitive interfaces can alternate in position with the two retardation layers. Moreover, the polarization-sensitive interfaces and the retardation layers can be oriented substantially parallel to one another. One of the two retardation layers can define a half-wave retardance with respect to the optical beam path and the input beam wavelength., and the other of the two retardation layers can defines quarter-wave retardance with respect to the optical beam path and the input beam wavelength. The input beam wavelength can be in the range of 1.2 microns to 1.7 microns.

The retardation layers can have fast axes oriented perpendicular to the optical beam path.

Each polarization-sensitive interfaces can preferentially reflect S-polarized incident light to produce the corresponding sample beam. The polarization-sensitive interfaces can include four polarization-sensitive interfaces providing four sample beams, and the intensities of the four sample beams can be sufficient to uniquely determine the state of polarization of the input beam.

The integrated optical assembly can also include an input prism positioned prior to the first polarization-sensitive interface with respect to the optical beam path. The input prism can have a first surface positioned to receive the input beam at substantially normal incidence and a second surface substantially parallel to the first polarization-sensitive interface. An input retardation layer can be included adjacent the first surface of the input prism.

The integrated optical assembly can further include an output prism positioned after the last polarization-sensitive interface with respect to the optical beam path. The output prism can have a first surface positioned substantially parallel to the last polarization-sensitive interface and a second surface substantially normal to the optical beam path. An output retardation layer can be included adjacent the second surface of the output prism.

The integrated optical assembly can also include a pair of transparent substrates having inner surfaces sandwiching each retardation layer. Each polarization-sensitive interfaces can be located at an outer surface of a corresponding one of the transparent substrates. One or more retardation layers can include two retardation layers and one of the polarization-sensitive interfaces can be a defined between the outer surfaces of adjacent ones of the transparent substrates for the two retardation layers. Another of the polarization-sensitive interfaces can be defined between the outer surface of the corresponding transparent substrate and a surface of an input prism. A third of the polarization-sensitive interfaces can be defined between the outer surface of the corresponding transparent substrate and a surface of an output prism. Each polarization-sensitive interface can include a coating on the outer surface of the corresponding transparent substrate. The coating can have an optical thickness along the optical beam path substantially equal to a quarter of the input beam wavelength. The coating can include a material having a refractive index lower than that of the transparent substrate (e.g., $MgF_2$).

The thickness of the transparent substrates can be at least 0.4 mm (e.g., at least 1.0 mm), and can include glass layers.

In another aspect, the invention features a state of polarization detector including an integrated optical assembly as described above and a detector array positioned to receive the sample beams from the integrated optical assembly, and during operation the detector array measures the intensities of the sample beams.

The detector array can include a plurality of detector elements, each positioned to receive a sample beam from the integrated optical assembly.

In a further aspect, the invention features a polarization controller system, include a state of polarization detector as described above and a polarization compensator, which during operation adjusts the polarization of the input beam. The polarization controller also includes a controller, which during operation receives a signal from the state of polarization detector and adjusts the polarization compensator based on the information from the intensities of the sample beams.

Implementations of the polarization controller system can include one or more of the following.

The state of polarization detector and polarization compensator can be positioned to first determine and then to adjust the state of polarization of the input beam.

The state of polarization detector and polarization compensator can be positioned to first adjust the state of polarization of the input beam and then determine the state of polarization of the adjusted beam.

The polarization compensator can include a stack of at least three variable retarders.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety. In case of conflict, the present specification, including definitions, will control. In addition, the apparatus, methods, and examples are illustrative only and not intended to be limiting.

Additional features, objects, and advantages of the invention will be apparent from the following detailed description and drawings, and from the claims.

DESCRIPTION OF DRAWINGS

Like reference symbols in the various drawings indicate like elements.

DETAILED DESCRIPTION

Figure 1:
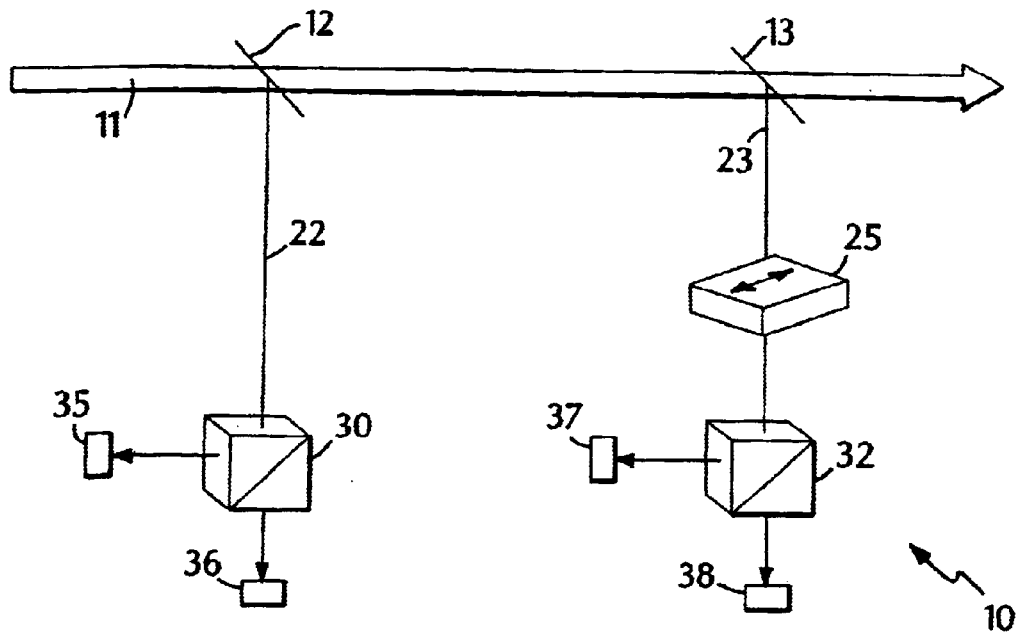
FIG. 1 is a schematic diagram of a prior art embodiment of a polarization analyzer.
Figure 2A:
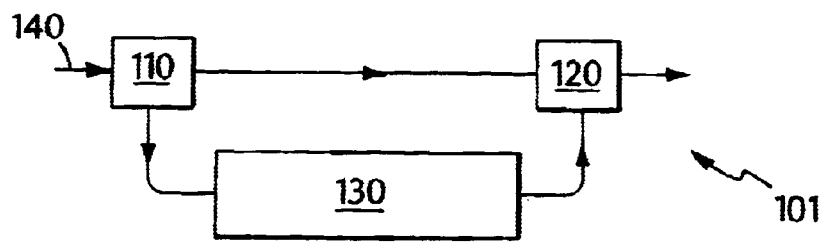
FIG. 2A is a schematic diagram of an embodiment of a feed-forward polarization compensation system.

Referring to FIG. 2A, a feed-forward polarization compensation system 101 includes a state of polarization (SOP) detector 110, a polarization compensator 120, and a controller 130. An input beam 140 is directed first through SOP detector 110 and then through polarization compensator 120. Polarization detector 110 measures the intensity of several sample beams derived from input beam 140. Based on the intensities of the sample beams, controller 130 determines the SOP and/or deviation from a desired SOP of the input beam. Controller 130 causes polarization compensator 120 to adjust the input beam SOP to the desired state.

An example of polarization compensator 120 includes three variable retarders that transform incident light with a continuously varying SOP to be linearly polarized along a specific polarization axis. The first and third variable retarders have their fast or slow axes oriented at 45° with respect to the exit polarization axis. The fast or slow axis of the middle variable retarder is parallel to the exit polarization axis. The middle retarder can be constructed from two liquid crystal cells with parallel (or perpendicular) slow axes, so they act in concert as a single retarder whose retardance is the sum (or difference) of their individual retardances.

Figure 2B:
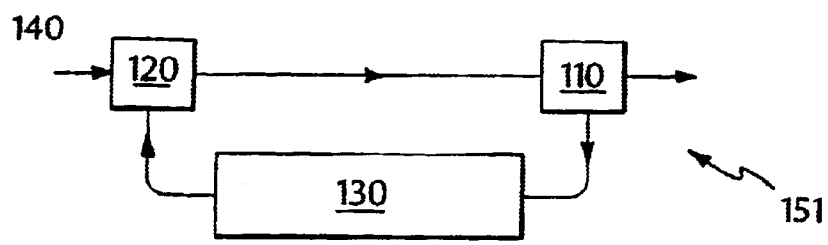
FIG. 2B is a schematic diagram of an embodiment of a feedback polarization compensation system.

While FIG. 2A shows a feed-forward polarization compensation system, in other implementations the components can be arranged in a feedback system. Referring to FIG. 2B, input beam 140 in feedback polarization compensation system 151 passes through polarization compensator 120 prior to SOP detector 110. Hence, controller 130 determines deviations of the compensated input beam SOP from a desired SOP. Controller 130 causes compensation system 120 to change the state of polarization of the input beam based on the SOP detected by SOP detector 110.

A description of SOP detector and polarization compensator embodiments follows.

Figure 3:
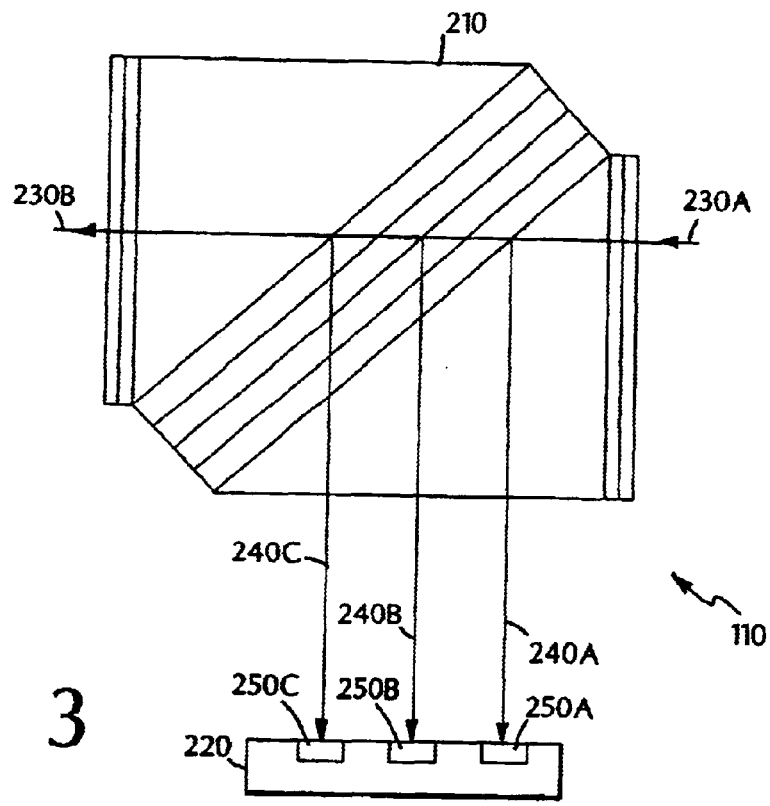
FIG. 3 is a schematic diagram of an embodiment of a state of polarization (SOP) detector.

Referring to FIG. 3, SOP detector 110 includes an integrated optical assembly 210 and a detector array 220. The components of optical assembly 210 will be discussed in detail below, and function to passively sample different components of input beam 230A. Input beam 230A exits optical assembly 210 as output beam 230B, which has substantially the same polarization state as input beam 230A. Insertion loss associated with the optical assembly 210 is small, so the intensity change of the beam is minimal.

Optical assembly 210 derives sample beams 240A, 240B, and 240C from input beam 230A and directs sample beams 240A, 240B and 240C toward detector array 220. Detector array 220 includes photodetectors 250A, 250B, and 250C, which measure the intensity of sample beams 240A, 240B, and 240C, respectively. The intensity of sample beam 240A is proportional to a first linear polarization component of the input beam. The intensity of sample beam 240B is proportional to a second orthogonal linear polarization component of the input beam. The intensity of the third sample beam 240C is related to both the first and second linear components of the input beam, and a phase angle between the components. Accordingly, the SOP compensator (not shown) stabilizes the SOP of input beam 230A to a desired input state based on the measured intensity of sample beams 240A, 240B, and 240C.

Sample beams 240A, 240B, and 240C may be continuously sampled from input beam 230A, and additional optical manipulation or analysis of the beams is not necessary (e.g., measuring different polarization components of each sample beam is not required). In other words, the intensity of sample beams 240A, 240B, and 240C provide information about the SOP of input beam 230A, and no additional optical components are required between integrated optical assembly 210 and detector array 220. Accordingly, integrated optical assembly 210 and detector 220 can be packaged in a compact, economical manner. Moreover, as sample beams 240A, 240B, and 240C exit optical assembly 210 along parallel paths, photodetectors 250A, 250B, and 250C can be in the form of a compact detector array. This can further compact the overall form factor, and potentially reduce cost, of SOP detector 110. Additionally, as the components of integrated optical assembly 210 are all passive, the response of polarization detector 110 is limited primarily by the speed of detector array 220 and associated electronics.

Figure 4:
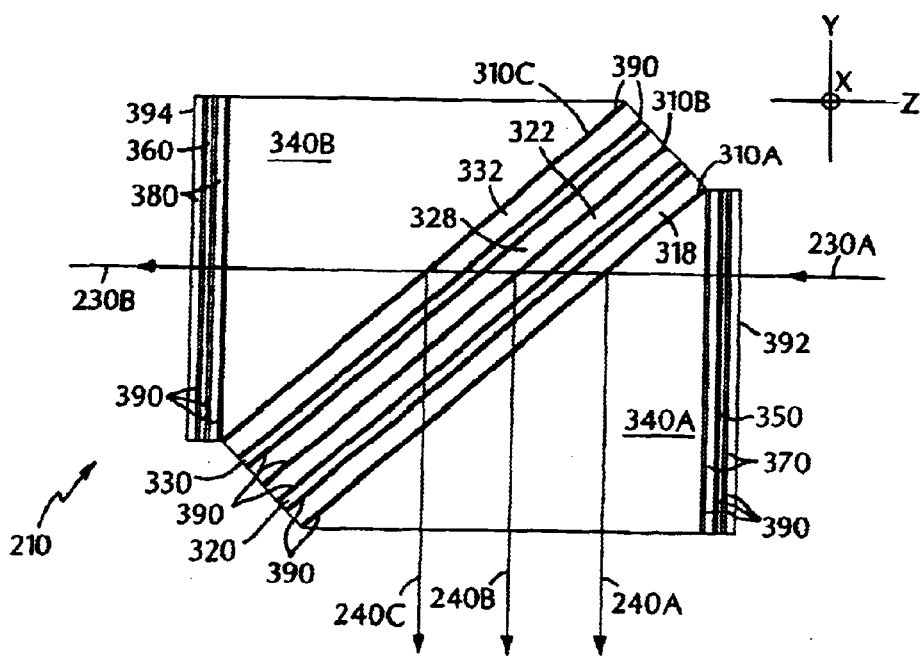
FIG. 4 is a schematic diagram of an embodiment of an optical assembly for the SOP detector of FIG. 2.

Referring to FIG. 4, integrated optical assembly 210 includes polarization-sensitive interfaces 310A, 310B and 310C, and two quartz retarders 320 and 330. Polarization-sensitive interfaces 310A, 310B, and 310C, are separated from retarders 320 and 330 by glass windows 318, 322, 328 and 332. Optical assembly 210 also includes two right angle prisms 340A and 340B. The hypotenuse of prism 340A and an adjacent surface of glass window 318 define polarization-sensitive interface 310A. Similarly, the hypotenuse of prism 340B and adjacent surface of glass window 332 define polarization-sensitive interface 310C. The adjacent surfaces of glass windows 322 and 328 define polarization-sensitive interface 310B. Input beam 230A is incident on the polarization-sensitive interfaces at 45°. To avoid ambiguity, we define a Cartesian co-ordinate system with the Z-axis parallel to the propagation direction of an ideally-directed input beam, the Y-axis (or vertical axis) as being perpendicular the Z-axis and in the plane of the page, and the X-axis (or horizontal axis) as being perpendicular to both the Y and Z-axes, perpendicular to the plane of the page. Tilt angles (e.g., polar angles) are expressed with respect to the X-Y plane, and azimuthal angles are measured from the X-axis in the X-Y plane. Using this co-ordinate system, the polarization-sensitive interfaces, retarders, and glass windows are tilted at 45° (i.e., a polar angle of 45°). Input beam 230A defines an input beam path, which, ideally, is parallel to the Z-axis.

Optionally, optical assembly 210 also includes pre-conditioning retarder 350 and post-conditioning retarder 360, both of which are untilted (e.g., they lie parallel to the X-Y plane). Pre-conditioning retarder 350 and post-conditioning retarder are sandwiched between glass windows 370A and 370B and 380A and 380B, respectively. Pre-conditioning retarder 350 can be used to change the SOP of an input beam with a nominally known SOP, transforming the SOP to one at which the detection system is more sensitive to SOP changes. Post-conditioning retarder 360 can include one or more retardation layers to cause output beam 230B to have substantially the same SOP as input beam 230A. For example, post-conditioning retarder 360 can include a set of retardation layers that transform the SOP by equal amounts but in an opposite direction, to retarders 320 and 330. This effectively "undoes" the SOP transformations of retarders 320 and 330 on input beam 230A's SOP. Alternatively, or additionally, post-conditioning retarder 360 can transform the beam's SOP to have a desired output SOP for a particular input SOP.

Adjacent components of the optical assembly are bonded together by optical adhesive layers 390, providing an integrated, robust assembly. In a preferred embodiment, optical adhesive layers 390 are index-matched to the glass windows and prisms. An example of such an optical adhesive is UV 15 epoxy, available from Master Bond (Hackensack, N.J.).

Polarization-sensitive interfaces 310A–C include low-index coatings, coated onto surfaces of glass windows 318 and 328, and the hypotenuse of prism 340B, respectively. Suitable low-index materials include, for example, $MgF_2$ (n=1.38) and Cryolite (n=1.35) (a sodium aluminum fluoride compound). The coatings have an optical thickness (i.e., the product of the refractive index and the physical thickness) less than a quarter wavelength of the input beam, but ideally equal to a quarter wavelength of the input beam measured along the input beam path.

The coatings create a refractive index mismatch at the polarization-sensitive interfaces, and each reflect a portion of incident input beam 230A. Accordingly, sample beams 240A, 240B, and 240C are derived from input beam 230A at interfaces 310A, 310B, and 310C, respectively. Interfaces 310A–C are oriented identically so sample beams 240A–C all propagate in the same direction, allowing for detection by a photodetector array. The thickness of glass windows 318, 322, 328, and 332 (along with retarder thickness) determines the separation of sample beams 240A–C. Window thickness can therefore be selected according to the spacing of the individual photodetectors in the detector array (not shown), ensuring sample beam separation matches detector separation.

The input beam path intersects interfaces 310A–C at a non-normal angle (in this case at 45°). Hence, interfaces 310A–C preferentially reflect one polarization state of the input beam, in this case S-polarized light. In general, S-polarized light refers to light polarized perpendicular to a plane of incidence defined by the normal to the reflective surface and the incident light ray. In this case, S-polarized light corresponds to light polarized parallel to the X-axis (horizontal linearly polarized light). Light polarized in the plane of incidence, orthogonal to the S-polarized light, is referred to as P-polarized light. Due to the small change in refractive index (e.g., $n_{glass} - n_{MgF_2} \approx 0.1$) and quarter-wave thickness of the coatings, the proportion of light reflected at each interface is small (such as no more than 5%, and preferably 3% or less). Moreover, due to the polarization sensitive nature of the reflections, sample beams 240A–C includes predominantly horizontal linearly polarized light.

Retarders 320 and 330 are quartz layers having fast axes untilted with respect to the z-axis. Retarder 320 is a half-wave retarder and retarder 330 is a quarter-wave retarder (with respect to the input beam wavelength). The fast axes of retarders 320 and 330 have azimuthal orientation angles of 22.5° and 45°, respectively. The quartz layer surfaces are tilted at 45° with respect to the Z-axis, which means the index ellipsoids of retarders 320 and 330 are tilted with respect to the retarder surfaces. Moreover, because of this tilt, the retarder surfaces can be oriented parallel to the polarization-sensitive interfaces, while the input beam path is parallel to a principle axis of the quartz. Hence, the amount of retardation experienced by input beam 230A is relatively insensitive to small deviations of the beam direction from the ideal input beam path. Furthermore, this further reduces the bulk of the optical assembly as the retarders and interfaces can be in the form of a stack of films.

Before discussing how the retarders affect the intensity of the sample beams, it is instructive to discuss how retarders affect the polarization of light in general. The SOP of a polarized beam can be defined by an ellipse having a major and minor axis (defining the ellipticity) and an orientation angle defining the tilt of the ellipse relative to a set of axes. The handedness of the SOP also needs to be known to uniquely define the polarization state. The tilt and ellipticity of the ellipse describe the path the electric field vector follows, and the handedness characterizes the direction (clockwise or anti-clockwise) the vector follows along the elliptical path. To track an input beam SOP and hold it to a desired state (e.g., horizontal or vertical linearly polarized light) via a feedback/feed-forward system usually requires three sample beams (i.e., three different measurements), although in certain cases two sample beams may be sufficient to stabilize the input beam SOP. To uniquely determine the input beam SOP from an unknown input beam SOP usually requires four measurements. These measurements can monitor one of the polarization parameters directly, or can measure a combination of the parameters.

Figure 5:
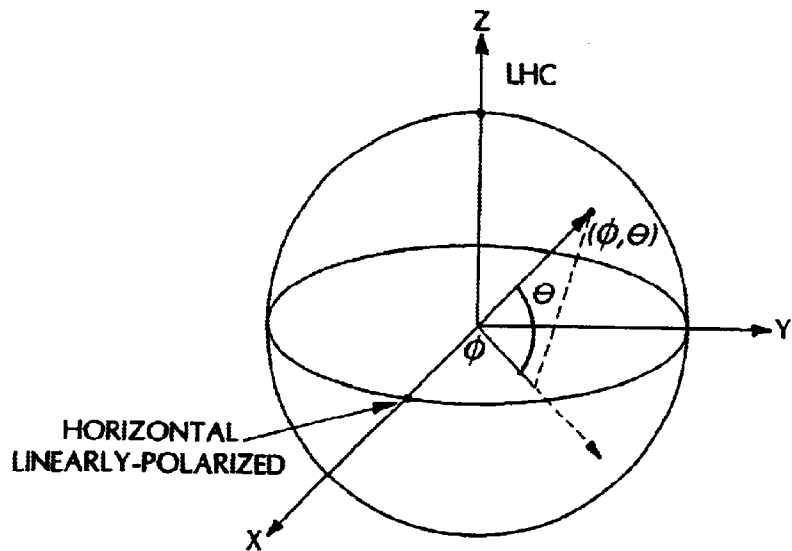
FIG. 5 is a diagram illustrating the Poincare sphere.

There are many equivalent ways to express SOP known in the art (e.g., as Stokes parameters, as latitude and longitude on the Poincare sphere, as a major and minor axis and angle of inclination of an ellipse, and/or as a Jones vector). For a detailed discussion of the various representations of SOP, and their relationship to one another, see, for example, "Optics of Liquid Crystal Displays," by P. Yeh and C. Gu, Chapter 2, John Wiley and Sons, New York (1999). Referring to FIG. 5, every state of polarized light can be expressed as a point on the surface of a unit sphere, the Poincare sphere. Each point on the surface of the sphere represents a unique polarization state. For example, the north pole corresponds to left-handed circular (LHC) polarization state, whereas the south pole corresponds to a right-handed circular (RHC) polarization state. States on the equator represent linearly polarized light, with the point on the equator at longitude 0° corresponding to a linear polarization state parallel to a horizontal direction, and the point with longitude 180° corresponding to a linear polarization state parallel to a vertical direction. In fact, any pair of antipodal points on the Poincare sphere (two points on the opposite side of the center of the sphere) correspond to states with orthogonal polarization.

Every polarization state can therefore be uniquely expressed by a Poincare longitude and latitude, $\phi$ and $\theta$, respectively. Note that $2\phi$ corresponds to the azimuthal orientation angle of the major axis of the polarization ellipse, and $\theta$ characterizes the ellipticity. The sign of SOP latitude characterizes the handedness (e.g., the southern hemisphere corresponds to right-handed light). Thus, every meridian represents a class of polarization states with different ellipticity but the same azimuthal orientation angle, while each parallel (latitude) represents a class of polarization states with the same ellipticity but different orientation angles.

The complicated effect of retarders on SOP can be modeled using the Jones calculus and then mapped onto the sphere, which yields mathematically correct results but little insight into how the device works. These effects are most easily visualized, and the action most readily understood, by straightforward geometric constructions performed on a sphere, such as a globe. The action of a waveplate with retardance R and a fast axis oriented at $\phi$, upon light at a given SOP is as follows. If one places a protractor with its fixed leg on the equator of the sphere at a longitude of $2\phi$, opens the protractor so the swinging leg is at the incident SOP, then swings the protractor through an angle of $2\pi R/\lambda$, the swinging leg will then be at the exit SOP (here, $\lambda$ is the wavelength of the light). For example, consider the example of a half wave plate positioned with axis of rotation at 45°. The fixed leg of the protractor is placed on the equator at 90° longitude. The half wave plate has a retardance equal $\lambda/2$, hence the rotation angle of the protractor about the fixed leg is $\pi$. Thus, linearly polarized light (light on the equator of the Poincare sphere) is transformed into linearly polarized light on the opposite side of the rotation axis. Note that light with incident SOP linearly polarized along +or −45° is unaffected by this transformation.

If the incident SOP lies on the far side of the globe and cannot be reached, the protractor may be placed at a location corresponding to $2(\pi/2+\phi)$ instead, and swung through an angle of $-2\pi R/\lambda$. The result is the same, namely that the swinging leg will indicate the exit SOP. This more graphical method is helpful in designing and debugging apparatus disclosed herein.

Note also that each Poincare longitude and latitude can be expressed as a Cartesian (x, y, z) co-ordinate. This representation is useful when considering the orthogonal horizontal and vertical components of an SOP described in reference to the present embodiment, as the intensity of the sample beams is directly proportional to the x-component of the sampled SOP. The x-axis intersects the Poincare sphere at horizontal linearly polarized light and vertical linearly polarized light SOP's, corresponding to x=+1 and x=−1, respectively. Hence, the x co-ordinate of an SOP is directly related to the intensity of the sample beams derived by integrated optical assembly 210. A sample beam with zero, or minimum, intensity corresponds to x=−1, vertically polarized light, and one with maximum intensity corresponds to x=+1.

This visualization provides insight into the relative sensitivity of the above-described SOP detector to changes in the SOP at different regions of the Poincare sphere. The most sensitive regions of the SOP detector system correspond to regions with large $dx/d\theta$ and large $dx/d\phi$. In other words, the SOP detector is most sensitive for regions of the sphere where the sample beam intensity changes rapidly with respect to changes in longitude and/or latitude. For example, for RHC and LHC polarization states have relatively large $dx/d\theta$'s and are states that are relatively sensitive to small SOP excursion in longitude (ellipticity). Conversely, regions of the Poincare sphere where the module is relatively insensitive to changes in SOP correspond to small $dx/d\theta$ and $dx/d\phi$. Horizontal and vertical linearly polarized light, for example, are relatively insensitive SOP's to similar excursions in both longitude and latitude. Accordingly, in embodiments where a nominal input SOP is known, it may be advantageous to transform the input SOP to a region of the sphere where the sample beam intensity is most sensitive to changes in SOP.

Returning now to the present embodiment, consider the case where the input beam SOP is always at or near vertical linearly polarized light (180, 0), and the desired output beam SOP is horizontal linearly polarized light (0, 0). Pre-conditioning retarder 350 is included in optical assembly 210, and is a quarter-wave retarder with fast axis oriented at 45°. Because the input polarization is nominally near (180, 0) on the Poincare sphere, pre-conditioning retarder 350 transforms the input SOP to circularly, or near circularly, polarized light of a first handedness (e.g., to near SOP (0, 90), near the north pole). Interface 310A produces sample beam 240A, whose intensity varies directly with the degree of horizontal polarization in the beam, and so indicates the x co-ordinate of the input beam SOP at this point. The intensity in this beam varies directly and monotonically with latitude error in the SOP of incident light. In other words, an input beam SOP having a latitude just south of the equator, for example, will result in a larger sample beam intensity than an input beam latitude just north of the equator.

Retarder 320, in this embodiment, is a half-wave retarder with fast axis oriented at 22.5°, and hence transforms the SOP to near the opposite pole on the Poincare sphere. This also transforms displacements in the Poincare x co-ordinate into displacements in the y co-ordinate, and vice versa. Noting that longitude errors in the SOP of the input beam result in displacements in y immediately after retarder 350, these displacements are now evident as displacements in x immediately after retarder 320. Accordingly, these displacements are observed by measuring the intensity of sample beam 240B, produced by interface 310B. Interface 310B preferentially samples horizontally polarized light, the intensity varies directly with x, which in turn corresponds directly and monotonically with longitude errors of the incident beam. Of course, the intensity of both sample beams 240A and 240B scale directly with the intensity of input beam 230A.

Retarder 330 is a quarter-wave retarder oriented with its fast axis at 45°, and transforms the SOP form near the pole to the location (180,0) on the Poincare sphere. Interface 310C samples the horizontal component of this SOP to yield sample beam 240C. Sample beam 240C has little or no intensity, since interface 310C preferentially samples the orthogonal component of the beam SOP at this point. Finally, post-conditioning retarder 360, a half-wave plate oriented at 45°, transforms the SOP to (0, 0), and output beam 230B exits optical assembly 210 nominally horizontal linearly polarized light.

In a variation of this embodiment, retarder 330 is a quarter wave retarder oriented at −45°, and transforms the SOP to at or near (0, 0). Sample beam 240C is now at or near maximum intensity, and does not vary rapidly as a function of input SOP for small excursions in SOP. In fact, the local slopes $dx/d\theta$ and $dx/d\phi$ for excursions in latitude and longitude are identically zero. Sample beam 240C can be used to monitor the incident beam intensity, albeit when the beam is known to be at or near the desired SOP.

Note that in the current embodiment, for an ideal input beam, the pre-conditioning retarder transforms the input SOP into perfectly circularly polarized light, which has equal horizontal and vertical components at interface 310A. Moreover, retarder 320 simply switches the handedness of the SOP, and the relative intensity of the horizontal and vertical components at interface 310B remains 1. Hence, the intensity of sample beams 240A and 240B should be equal. Accordingly, any difference between the intensities of sample beams 240A and 240B indicates a deviation from the desired input SOP. A controller can monitor the intensity of (or difference in intensity between) the sample beams and cause a polarization compensator to compensate the SOP of the input beam 230A accordingly. Hence, only two sample beams may be necessary in some embodiments. Also, the orthogonality of the components sampled by beams 240A and 240B enables one to correct the appropriate variable (e.g., latitude or longitude) when tracking or modifying the SOP via the polarization compensator (see, e.g., FIG. 2A). The monotonicity of the relative variation in intensity of these two beams with respect to latitude and longitude, respectively, enables the system to have a known sense of feedback, rather than rely on hunt-and-climb algorithms or dithering.

In some embodiments, there may be secondary beams reflected from the surfaces of the retarder layers, or other interfaces in the optical assembly. For example, if the refractive index of the glass windows (and adhesive layers) is not exactly matched to the index of the retarder layers, there is likely to be a reflected component directed parallel to the sample beams. Glass windows 318, 322, 328, and 332 can be selected to match both the separation of the sample beams with the photodetector geometry, and to position unwanted reflected components between photodetectors to prevent potential contamination of the detected sample beam intensities. For example, the glass windows can be at least 0.25 mm thick (such as at least 0.4 mm, 0.5 mm, 1.0 mm or more). Alternatively, or additionally, glass windows 318, 322, 328 and 332 can be wedge-shaped, so that the interfaces between the glass windows and retarders 320 and 330 are not parallel to the polarization-sensitive interfaces 310A, 310B, and 310C. Accordingly, sample beams 240A, 240B, and 240C would not be parallel to secondary beams reflected from the glass/retarder interfaces.

Optionally, surfaces 392 and 394 can be coated with antireflection layers to reduce insertion loss associated with Fresnel reflections of the input beam from these surfaces.

Figure 6:
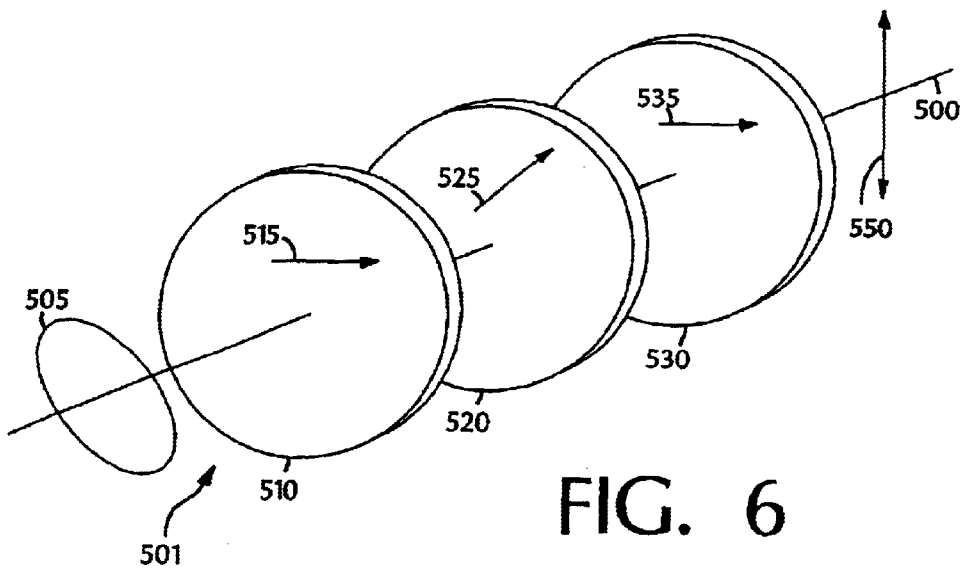
FIG. 6 is a schematic diagram of an embodiment of a polarization compensator.

Referring to FIG. 6, a polarization compensator 501 suitable for use with the foregoing SOP detector includes a stack of three variable retarders 510, 520, and 530. Outer retarders 510 and 530 have slow axes 515 and 535 parallel or perpendicular to one another, and middle retarder 520 has its axis 525 at 45° to them. The SOP of the beam 500 leaving the retarder stack is linearly polarized along an axis that is parallel or perpendicular axis 525. The retarder stack is essentially the same as the stack disclosed by U.S. Pat. No. 4,979,235, to Rumbaugh et al. ("Rumbaugh"), and the operation is similar except that the current embodiment is operated in reverse: where Rumbaugh describes converting light of known linear polarization to a continuously varying arbitrary SOP for homodyne detection purposes, the retarder stack in compensator 501 converts light of continuously varying arbitrary SOP into a specific output SOP such as a linearly polarized state.

Variable retarder 510 converts the arbitrary input SOP 505 to a linear polarization state 550 whose axis depends on the initial SOP. Variable retarders 520 and 530 act as a Senarmont rotator to transform the axis of linear polarization to the desired orientation. Specifically, retarder 520 transforms the SOP to lie on the meridian of 0° longitude, which means that it is operated at a retardance of $\lambda/4$ or $3\lambda/4$. Variable retarder 530 adjusts the Poincare latitude of the exit SOP as needed to place it on the equator without altering its longitude from 0°.

Errors in the exit SOP latitude may be corrected by adjusting the retardance of the third variable retarder, which does not alter the exit SOP longitude. Conversely, retarder 510 varies the longitude of the SOP, without altering its latitude. Adjusting the first element slightly about a desired retardance shifts the SOP of light exiting the element to lie slightly above or slightly below the equator of the Poincare sphere. Retarder 520, being a $\lambda/4$ or $3\lambda/4$ plate at 0°, transforms this to an SOP that lies just East or West of the 0° longitude meridian. Finally, retarder 530 furhter transforms this to a point on the equator, just East or West of the desired SOP.

As the polarization compensator is designed so that one variable retarder adjusts the Poincare latitude, and the other variable retarder adjusts the Poincare longitude, the action of the retarders is orthogonal and there is a one-to-one correspondence between a specific parameter measured by the SOP detector, and a control element in the polarization compensator that adjusts that specific parameter. Errors in the sensed longitude may be corrected by adjusting the compensator that adjusts longitude, and similarly in latitude. Servo control of the SOP can be readily achieved by the use of independent control circuitry for each of these parameters.

While in the foregoing embodiments, the retardations, orientations, and number of retarders in the SOP detector are specified for measuring deviations of the input beam SOP from vertical linearly polarized light, other arrangements are also possible. In general, any combination of retarders, and their relative orientations, can be chosen such that the sample beam intensities are related to input beam SOP in a desired way. For example, to detect deviations from a particular input SOP, one can select retarders to transform the input SOP on the Poincare sphere so that two sample beam intensities are related to orthogonal measures of the input SOP.

Furthermore, in some embodiments, not all the polarization-sensitive interfaces are parallel. In other words, the interfaces can be oriented to direct the sample beams in non-parallel directions. For example, two interfaces may be oriented to direct sample beams along orthogonal paths. This may obviate the need for a retarder between adjacent interfaces.

Figure 7:
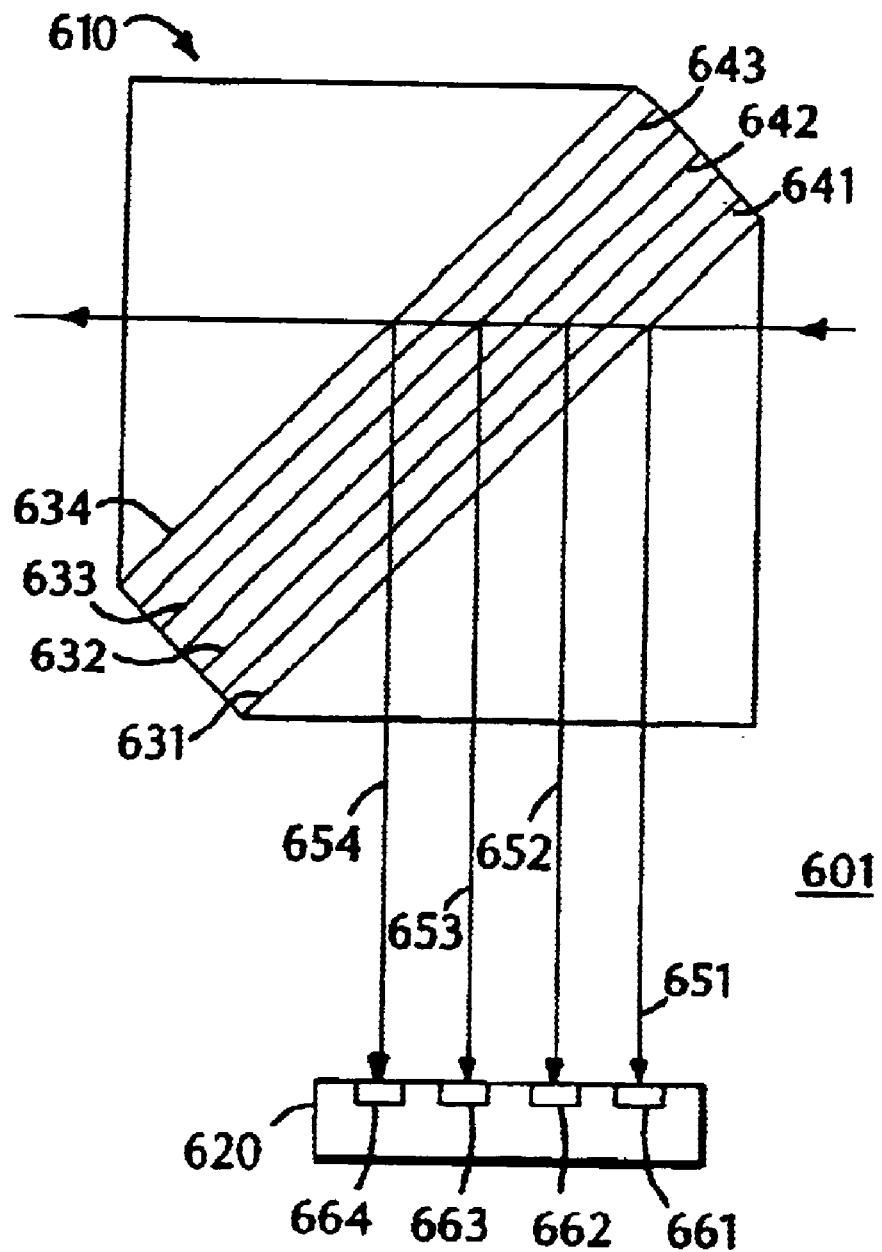
FIG. 7 is a schematic diagram of another embodiment of a SOP detector.

In some embodiments, an integrated optical assembly can be constructed to sample four beams from an input beam, providing for SOP detection for any arbitrary input beam state. Referring to FIG. 7, SOP detector 601 includes an integrated optical assembly 610 and a detector array 620. Optical assembly 610 is similar in construction to optical assembly 210 (see FIG. 3), but includes four polarization-sensitive interfaces 631–634 and three retarders 641–643. Input beam 605 of unknown SOP is directed into the assembly. Interfaces 631–634 each reflect a small portion of input beam 605 towards detector array 620, which exit assembly 610 as sample beams 651–654. Photodetectors 661–664 monitor the respective intensities of sample beams 651–654. Retarders 641 and 642 are half-wave retarders with fast axes oriented at 45° and 22.5°, respectively, and retarder 643 is a quarter-wave retarder with fast axis at 45°. Because polarization sensitive interfaces 631–634 preferentially sample horizontally polarized light (S-polarized light) and due to the retardation of input beam 605 as it passes through retarders 631–633, the intensity of sample beams 651–654 is related to the degree to which input beam 605 is polarized horizontally, vertically, at 45°, and circularly, respectively.

The Stokes parameters, which uniquely describe the SOP of light, can be determined from such intensity measurements. In situations where four intensity values corresponding to a horizontal component, a vertical component, a component at 45°, and a circular component, are represented as $A_1$, $A_2$, $A_3$, and $A_4$, respectively, the Stokes parameters can be determined as:

$$I = A_1 + A_2;$$

$$Q = A_1 - A_2;$$

$$U = 2A_3 - I;$$

$$V = \frac{2A_4 - I - U\cos\delta}{\sin\delta}$$

Here, δ refers to the retardance of the wave plate (a quarter wave plate), which, in this case, simplifies V to $2A_4-I$. Note that the Stokes parameters Q, U, and V correspond to the co-ordinates x, y, and z on the Poincare sphere.

While embodiments for deriving three and four sample beams from an input beam have been described, other implementations are also possible. For example, optical assemblies can be similarly constructed with fewer than three polarization-sensitive interfaces (e.g., 1 or 2 interfaces). An implementation requiring two sample beams may be one in which only two orthogonal polarization components are monitored to provide a control signal to a polarization compensator based on the ratio of the components. Alternatively, some implementations may require more than four sample beams (e.g., five, six, or more sample beams).

Figure 8:
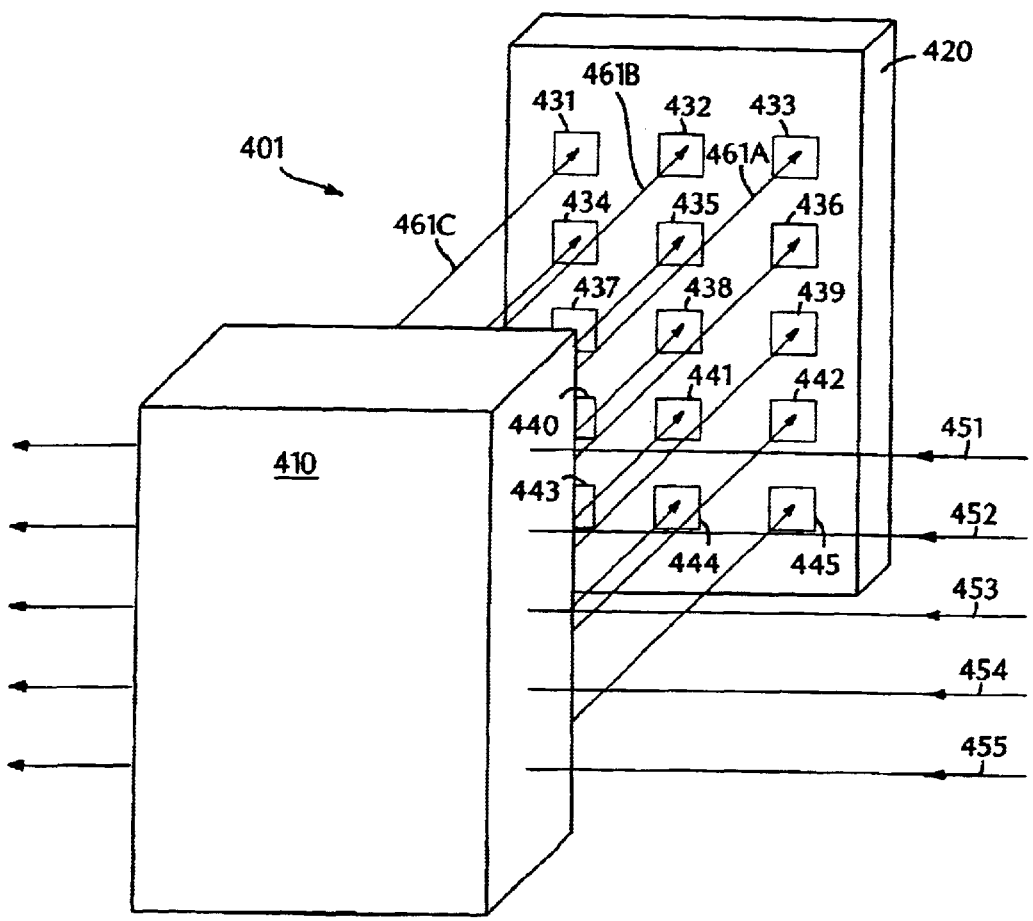
FIG. 8 is a perspective view of a further embodiment of a SOP detector.

In some embodiments, an SOP detector can be used to monitor the SOP of more than one input beam. For example, and with reference to FIG. 8, an SOP detection system 401 simultaneously detects the SOP of five input beams. SOP detector 401 includes optical assembly 410 and detector 420. Detector 420 includes an array of photodetectors 431–445, positioned to measure the intensity of sample beams from input beams 451–455. Optical assembly 410 taps three sample beams from each input beam, and directs them to a corresponding photodetector in detector 420. For example, optical assembly 410 taps sample beams 461A, 461B, and 461C from input beam 451, and directs them to photodetectors 433, 432, and 431, respectively. While the current embodiment shows a polarization detector for detecting the SOP of five input beams, SOP detectors for measuring more or fewer than five input beams are also possible. Individual SOP detectors can also be stacked or grouped in arrays to provide SOP detection systems for large numbers of input beams (e.g., 50, 100, 500 or more).

While in the foregoing embodiments the retarders are quartz retarders, retarders can also be formed from one or more layers of other birefringent materials. The retardation layers can be formed from oriented (e.g., stretched) polymer films, such as polyvinyl alcohol (PVA), polycarbonate, polyethylene terapthelate (PET), which are sold commercially for use in liquid crystal and other displays and optical systems. Vendors include 3M (St. Paul, Minn.), Sanritz (San Jose, Calif.), Nitto Denko (Fremont, Calif.), and International Polarizer (Marlboro, Mass.). Retardation layers can also be formed from oriented polyimide films, liquid crystal polymers, low-molecular weight liquid crystal cells, and photo-oriented polymers (e.g., LCP and LPP from Rolic (Basel, Switzerland). Other inorganic materials can also be used for the retardation layers. Examples include lithium niobate, calcite, mica, and $CaF_2$, available from optical suppliers such as Karl Lambrecht (Chicago, Ill.), Meadowlark Optics (Longmont, Colo.), and VLOC (Port Richey, Fla.).

Retarders can be achromatic retarders, in which case the associated apparatus for sensing SOP is achromatic over a desired wavelength range. Achromatic retarders can be purchased from Meadowlark Optics (Longmont, Colo.), or can be built from individual retardation layers using designs known in the art and described by, for example, C. M. McIntyre and S. E. Harris in "Achromatic Wave Plates for the Visible Spectrum," *J. Opt. Soc. Am.*, 58, p. 1575 (1968).

Moreover, retarders can include more than one birefringent layer. For example, post-conditioning retarder can include three layers, each layer designed to compensate for the SOP transformations introduced by retarders 320, 330, and 350, respectively (see FIG. 4). Also, retarders 320 and 330 can include more than one birefringent layer. For example, in embodiments where very small retardances are required, it may be desirable to use two retarders having similar retardations, oriented with their fast axes at 90° to each other. The effective retardation of such a retarder is the difference between the retardations of the individual layers.

Furthermore, polarization-sensitive interfaces 310A, 310B, and 310C can be any optical interface that preferentially samples one polarization state. For example, a planar glass window oriented at or near Brewster's angle may be used as a polarization-sensitive interface, since it samples essentially none of the P-component and approximately 8% of the S-component. A window operated at other angles can also be used, for example, at 45° to the input beam path. Such an orientation provides for similar geometries as the SOP detectors described above.

Also, the glass windows sandwiching retarders 320 and 330 can be wedge-shaped to offset the orientation of the retarder surfaces from the polarization-sensitive interfaces. Any reflections from the retarder/window interfaces will be in different directions relative to sample beams 240A–C and would be unlikely to interfere with sample beam detection. Accordingly, in these embodiments, the orientation of the retarder polarization ellipse is adjusted relative to the retarder surfaces to provide the desired retardation along the input beam path.

The photodetectors used to measure the intensity of the sample beams (e.g., photodetectors 250A, 250B, and 250C in FIG. 3) can be any photodetectors sensitive to the wavelength of the input beam. For example, InGaAs detectors have reasonable responsivity (e.g., more than 0.6 A/W) and are effective in the 1.3 to 1.7 µm wavelength range. Si-based photodetectors are effective for the 0.3 to 1.1 µm wavelength range. Accordingly, detectors (such as PIN photodiodes and avalanche photodiodes) based on InGaAs and Si can be suitable for detecting sample beams in these respective wavelength ranges.

In embodiments utilizing detector arrays, photodetector size and arrangement should be selected according to the separation of the sample beams and any secondary beams reflected from other component interfaces in the optical assembly. For example, the size and spacing of photodetectors in a detector array can be chosen so that, when properly aligned, each sample beam is incident on a detector, while secondary beams reflected from the interfaces of the retarders and glass windows fall between the photodetectors and are not detected. Optionally, additional photodetectors may be included in the detector array and aligned with the secondary beams.

In some embodiments, the photodetectors are integrated into a single detector component. For example, solid state photodetector arrays can be packaged in a single compact circuit board. Often, such detector arrays can be integrated with amplifiers, which results in more compact detection systems, and can improve performance by reducing the capacitance associated with the connection from the photodetector output to the amplifier input.

A number of embodiments of the invention have been described. Nevertheless, it will be understood that various modifications may be made without departing from the spirit and scope of the invention. Accordingly, other embodiments are within the scope of the following claims.

What is claimed is:

1. An integrated optical assembly comprising:
   a series of polarization-sensitive interfaces defining an optical beam path for an input optical beam to pass through the assembly, wherein each polarization-sensitive interface derives a sample beam from the input beam; and
   one or more retardation layers each positioned between a different pair of the polarization-sensitive interfaces, wherein the retardation layers are integrally coupled with the polarization-sensitive interfaces, and wherein the retardation layers and polarization-sensitive interfaces cause each sample beam to have an intensity that provides different information about the state of polarization of the input beam.

2. The assembly of claim 1, wherein one of the retardation layers is oriented substantially parallel with one of the polarization-sensitive interfaces.

3. The assembly of claim 1, wherein each polarization-sensitive interface derives less than 5% of the input beam intensity to produce the corresponding sample beam.

4. The assembly of claim 3, wherein each polarization-sensitive interface derives less than 2% of the input beam intensity to produce the corresponding sample beam.

5. The assembly of claim 1, wherein at least two of the polarization-sensitive interfaces are oriented substantially parallel to one another.

6. The assembly of claim 5, wherein all of the polarization-sensitive interfaces are oriented substantially parallel to one another.

7. The assembly of claim 1, wherein the optical beam path contacts each polarization-sensitive interface at a non-normal angle.

8. The assembly of claim 7, wherein the non-normal angle for each polarization-sensitive interface is in the range of 30 degrees to 60 degrees.

9. The assembly of claim 7, wherein the series of polarization-sensitive interfaces comprise three polarization-sensitive interfaces providing three sample beams.

10. The assembly of claim 9, wherein the one or more retardation layers comprise two retardation layers and wherein the three polarization-sensitive interfaces alternate in position with the two retardation layers.

11. The assembly of claim 10, wherein the polarization-sensitive interfaces and the retardation layers are oriented substantially parallel to one another.

12. The assembly of claim 10, wherein the optical beam path contacts each of the retardation layers at a non-normal angle.

13. The assembly of claim 12, wherein the non-normal angle for each retardation layer is in the range of 30 degrees to 60 degrees.

14. The assembly of claim 12, wherein one of the two retardation layers defines a half-wave retardance with respect to the optical beam path and the input beam wavelength.

15. The assembly of claim 14, wherein the other of the two retardation layers defines a quarter-wave retardance with respect to the optical beam path and the input beam wavelength.

16. The assembly of claim 14, wherein the input beam wavelength is in the range of 1.2 microns to 1.7 microns.

17. The assembly of claim 9, wherein the plurality of polarization-sensitive interfaces comprise four polarization-sensitive interfaces providing four sample beams, and wherein the intensities of the four sample beams are sufficient to uniquely determine the state of polarization of the input beam.

18. The assembly of claim 7, wherein the retardation layers have fast axes oriented perpendicular to the optical beam path.

19. The assembly of claim 7, further comprising an input prism positioned prior to the first polarization-sensitive interface with respect to the optical beam path.

20. The assembly of claim 19, wherein the input prism has a first surface positioned to receive the input beam at substantially normal incidence and a second surface substantially parallel to the first polarization-sensitive interface.

21. The assembly of claim 20, further comprising an input retardation layer adjacent the first surface of the input prism.

22. The assembly of claim 21, wherein the output prism has a first surface positioned substantially parallel to the last polarization-sensitive interface and a second surface substantially normal to the optical beam path.

23. The assembly of claim 22, further comprising an output retardation layer adjacent the second surface of the output prism.

24. The assembly of claim 7, further comprising an output prism positioned after the last polarization-sensitive interface with respect to the optical beam path.

25. The assembly of claim 1, wherein each polarization-sensitive interfaces preferentially reflects S-polarized incident light to produce the corresponding sample beam.

26. The assembly of claim 1, further comprising a pair of transparent substrates having inner surfaces sandwiching each retardation layer.

27. The assembly of claim 26, wherein each polarization-sensitive interfaces is located at an outer surface of a corresponding one of the transparent substrates.

28. The assembly of claim 27, wherein the one or more retardation layers comprise two retardation layers and one of the polarization-sensitive interfaces is a defined between the outer surfaces of adjacent ones of the transparent substrates for the two retardation layers.

29. The assembly of claim 28, further comprising an input prism and wherein another of the polarization-sensitive interfaces is defined between the outer surface of the corresponding transparent substrate and a surface of the input prism.

30. The assembly of claim 29, further comprising an output prism and wherein a third of the polarization-sensitive interfaces is defined between the outer surface of the corresponding transparent substrate and a surface of the output prism.

31. The assembly of claim 27, wherein each polarization-sensitive interface comprises a coating on the outer surface of the corresponding transparent substrate.

32. The assembly of claim 31, wherein the coating has an optical thickness along the optical beam path substantially equal to a quarter of the input beam wavelength.

33. The assembly of claim 31, wherein the coating comprises a material having a refractive index lower than that of the transparent substrate.

34. The assembly of claim 33, wherein the anti-reflection coating comprises $MgF_2$.

35. The assembly of claim 26, wherein the thickness of the transparent substrates are at least 0.4 mm.

36. The assembly of claim 35, wherein the thickness of the transparent substrates are at least 1.0 mm.

37. The assembly of claim 36, wherein the transparent substrates comprise glass layers.

38. A state of polarization detector comprising:

the integrated optical assembly of claim 1; and a detector array positioned to receive the sample beams from the integrated optical assembly, and during operation the detector array measures the intensities of the sample beams.

39. The state of polarization detector of claim 38, wherein the detector array comprises a plurality of detector elements, each positioned to receive a sample beam from the integrated optical assembly.

40. A polarization controller system, comprising:

the state of polarization detector of claim 38;

a polarization compensator, which during operation adjusts the polarization of the input beam; and a controller, which during operation receives a signal from the state of polarization detector and adjusts the polarization compensator based on the information from the intensities of the sample beams.

41. The system of claim 40, wherein the state of polarization detector and polarization compensator are positioned to first determine and then to adjust the state of polarization of the input beam.

42. The system of claim 40, wherein the state of polarization detector and polarization compensator are positioned to first adjust the state of polarization of the input beam and then determine the state of polarization of the adjusted beam.

43. The system of claim 40, wherein the polarization compensator comprises a stack of at least three variable retarders.

* * * * *

UNITED STATES PATENT AND TRADEMARK OFFICE
CERTIFICATE OF CORRECTION

PATENT NO. : 6,717,706 B2  
DATED : April 6, 2004  
INVENTOR(S) : Peter J. Miller and Paul J. Cronin It is certified that error appears in the above-identified patent and that said Letters Patent is hereby corrected as shown below:

Title page,  
Item [63], Related U.S. Application Data, replace "Aug. 31, 2001" with -- Aug. 31, 2000 --

Column 1,  
Line 12, replace "Aug. 31, 2001" with -- Aug. 31, 2000 --

Column 17,  
Line 3, delete "a" before "defined"

Signed and Sealed this

First Day of February, 2005

JON W. DUDAS  
*Director of the United States Patent and Trademark Office*